US008026795B2

(12) United States Patent
Qi

(10) Patent No.: US 8,026,795 B2
(45) Date of Patent: *Sep. 27, 2011

(54) RFID SENSOR ARRAY AND SENSOR GROUP BASED ON PULSE-PROCESSING

(76) Inventor: Baohua Qi, Columbus, IN (US)

( * ) Notice: Subject to any disclaimer, the term of this patent is extended or adjusted under 35 U.S.C. 154(b) by 388 days.

This patent is subject to a terminal disclaimer.

(21) Appl. No.: 12/070,665

(22) Filed: Feb. 20, 2008

(65) Prior Publication Data

US 2008/0204198 A1 Aug. 28, 2008

Related U.S. Application Data

(60) Provisional application No. 60/902,679, filed on Feb. 22, 2007.

(51) Int. Cl.
*H04Q 5/22* (2006.01)

(52) U.S. Cl. ............. 340/10.1; 340/10.3; 340/539.26; 340/572.1; 340/445; 380/37

(58) Field of Classification Search .......... 340/539.26, 340/572.1, 870.01–870.06, 870.16–870.17, 340/10.41, 539.11–539.12, 539.22–539.29, 340/572.7, 10.1, 10.3
See application file for complete search history.

(56) References Cited

U.S. PATENT DOCUMENTS

| | | | | | |
|---|---|---|---|---|---|
| 3,029,310 | A | * | 4/1962 | Heiser | 370/430 |
| 3,775,751 | A | * | 11/1973 | Anderson | 370/465 |
| 3,864,578 | A | * | 2/1975 | Lackey | 307/10.1 |
| 4,006,477 | A | * | 2/1977 | Yost et al. | 342/51 |
| 4,075,632 | A | * | 2/1978 | Baldwin et al. | 342/51 |
| 4,241,320 | A | * | 12/1980 | Fausone et al. | 333/18 |
| 4,901,351 | A | * | 2/1990 | Tanaka et al. | 380/223 |
| 4,916,643 | A | * | 4/1990 | Ziegler et al. | 702/188 |
| 4,979,124 | A | * | 12/1990 | Sachse et al. | 702/38 |
| 5,252,962 | A | * | 10/1993 | Urbas et al. | 340/870.17 |
| 5,335,664 | A | * | 8/1994 | Nagashima | 600/508 |
| 5,345,231 | A | * | 9/1994 | Koo et al. | 340/870.31 |
| 5,422,930 | A | * | 6/1995 | McDonald et al. | 455/411 |
| 5,481,262 | A | * | 1/1996 | Urbas et al. | 340/870.17 |
| 5,602,538 | A | * | 2/1997 | Orthmann et al. | 340/10.2 |
| 5,661,651 | A | * | 8/1997 | Geschke et al. | 701/88 |
| 5,760,577 | A | * | 6/1998 | Shizuya | 324/207.16 |
| 5,777,557 | A | * | 7/1998 | Fayfield | 340/635 |
| 5,794,151 | A | * | 8/1998 | McDonald et al. | 455/454 |
| 6,044,333 | A | * | 3/2000 | Stobbe et al. | 702/106 |
| 6,049,280 | A | * | 4/2000 | Andersson | 340/573.3 |
| 6,172,609 | B1 | * | 1/2001 | Lu et al. | 340/572.4 |
| 6,198,785 | B1 | * | 3/2001 | Flynn | 375/377 |
| 6,249,212 | B1 | * | 6/2001 | Beigel et al. | 340/10.34 |
| 6,437,692 | B1 | * | 8/2002 | Petite et al. | 340/540 |
| 6,480,143 | B1 | * | 11/2002 | Kruger et al. | 342/44 |
| 6,720,866 | B1 | * | 4/2004 | Sorrells et al. | 340/10.4 |
| 6,756,856 | B2 | * | 6/2004 | Song et al. | 331/176 |
| 6,891,838 | B1 | * | 5/2005 | Petite et al. | 370/401 |
| 6,897,788 | B2 | * | 5/2005 | Khair et al. | 340/870.16 |

(Continued)

*Primary Examiner* — Benjamin C Lee
*Assistant Examiner* — Quang D Pham

(57) ABSTRACT

An RFID device having sensor arrays incorporated in its tags. Each tag generates an ID code together with sensing pulses the width of which changes with sensing values. Conflicts between tags in communication are avoided by adding a sleep section to the code sequence. The interrogator reads the ID code and digitizes the width of sensing pulses during the communication with tags, and then calculates sensing values based on the information obtained. Since only discrete signals exist in data acquisition, and the digitization process is in parallel with data communication, the system needs neither ADC circuits nor an extra process for signal digitization.

20 Claims, 9 Drawing Sheets

U.S. PATENT DOCUMENTS

| | | | |
|---|---|---|---|
| 7,040,139 B2* | 5/2006 | Sunshine | 73/23.2 |
| 7,397,370 B2* | 7/2008 | Bratkovski | 340/539.26 |
| 7,520,374 B2* | 4/2009 | Martin et al. | 194/317 |
| 7,619,346 B2* | 11/2009 | Yazdi | 310/307 |
| 2001/0004236 A1* | 6/2001 | Letkomiller et al. | 340/572.1 |
| 2002/0036569 A1* | 3/2002 | Martin | 340/573.1 |
| 2002/0101769 A1* | 8/2002 | Garverick et al. | 365/200 |
| 2002/0176356 A1* | 11/2002 | Courtney et al. | 370/216 |
| 2003/0009202 A1* | 1/2003 | Levine | 607/58 |
| 2003/0052781 A1* | 3/2003 | Iwasawa et al. | 340/556 |
| 2003/0133435 A1* | 7/2003 | Friedrich | 370/349 |
| 2004/0011194 A1* | 1/2004 | Lederer et al. | 92/5 R |
| 2004/0036626 A1* | 2/2004 | Chan et al. | 340/870.17 |
| 2004/0183572 A1* | 9/2004 | Bohl et al. | 327/110 |
| 2005/0137652 A1* | 6/2005 | Cauller et al. | 607/60 |
| 2005/0285726 A1* | 12/2005 | Haswell et al. | 340/445 |
| 2006/0114120 A1* | 6/2006 | Goldstone | 340/825.72 |
| 2006/0122473 A1* | 6/2006 | Kill et al. | 600/300 |
| 2006/0145881 A1* | 7/2006 | Sakatani et al. | 340/679 |
| 2007/0018837 A1* | 1/2007 | Mizutani et al. | 340/635 |
| 2007/0229228 A1* | 10/2007 | Yamazaki et al. | 340/10.34 |
| 2007/0229271 A1* | 10/2007 | Shionoiri et al. | 340/572.1 |
| 2007/0229281 A1* | 10/2007 | Shionoiri et al. | 340/572.7 |
| 2007/0285254 A1* | 12/2007 | Usami | 340/572.7 |
| 2008/0055047 A1* | 3/2008 | Osada et al. | 340/539.22 |
| 2008/0100435 A1* | 5/2008 | Jorgenson et al. | 340/539.22 |
| 2008/0129475 A1* | 6/2008 | Breed et al. | 340/438 |
| 2008/0136646 A1* | 6/2008 | Friedrich | 340/572.7 |
| 2008/0191866 A1* | 8/2008 | Falck et al. | 340/539.12 |
| 2008/0210762 A1* | 9/2008 | Osada et al. | 235/492 |
| 2008/0252254 A1* | 10/2008 | Osada | 320/108 |

* cited by examiner

RFID SENSOR ARRAY AND SENSOR GROUP BASED ON PULSE-PROCESSING

This present application claims priority from U.S. provisional application No. 60/902,679 having the same title as the present invention and filed on Feb. 22, 2007.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

This invention relates to radio frequency identification (RFID) devices, and more particularly, to RFID based sensor arrays and sensor groups, the data acquired from which is read by an interrogator.

BACKGROUD OF THE INVENTION

Radio frequency identification devices generally include RF tags and an interrogator, which generates a continuous wave (CW) RF carrier. The tag has an antenna for RF communication and an ID (identification) code stored in its memory. Upon receiving a CW carrier, the tag generates a digital pulse sequence based on the stored ID code and uses this pulse sequence for modifying the amplitude of the received CW carrier by loading and unloading its antenna. The modulated backscattering signals are then reflected back to the interrogator and demodulated thereafter, thereby the information stored in tags is read by the interrogator. RFIDs tags can be read through water, paint, dirt, wood, plastics, and even human bodies. They are used broadly in security systems, electronic access cards, and inventory management systems.

RFIDs can also be used with sensors. In this application, typically, physical or chemical properties of an object, such as temperature, humidity, pressure, speed, pH, and acceleration, are transduced into analog electrical signals. Then an Analog to Digital Converter (ADC) is employed to convert the analog signals into digital signals, which are then read by the interrogator during a sampling cycle. Since an ADC compares analog input voltage with a reference voltage in generating digital signals, to obtain an accurate result, a high precision and stable reference voltage source is needed, and the variation of input voltage during sampling should be minimized. However, power supply of RFID tags is usually generated by converting CW to direct current (DC). It is not easy to obtain a steady and precise reference voltage. Additionally, sensing signal conditioning and analog to digital signal conversion need extra power consumption. As a result, a more powerful CW or closer operation range is required.

Sensor arrays and sensor groups find their applications in a variety of fields, e.g. chemical sensing, gas sensing, and fingerprint sensing, where a single sensor is not able to detect some properties of an object. However, normally passive RFIDs can not work with a sensory array, since for a sensory array or sensor group, a complex signal processing circuit including a multiplexer circuit and control logic, an ADC, and a sample and hold (S/H) circuit is needed, and the simple RFID power supply obtained from the CW carrier is not capable in supporting all these circuits. Battery powered RFIDs can be used with a sensor array, however, with the cost of losing desirable features: simple, compact, and powerless.

BRIEF SUMMARY OF THE INVENTION

It is an object of the present invention to provide a RFID tag that is able to work with an interrogator to convert analog electrical signals obtained from a sensor array or sensor group into digital signals without using ADCs, so that the signal acquisition is not sensitive to variations in power supply.

Another object of the present invention is to provide a means for transmitting the sensing information with ID codes.

In the device presented in this invention, sensing elements are incorporated into RFID tags, and sensing information is sent back to the interrogator with ID codes. Different from other devices converting voltage level obtained from a sensor array or sensor group into digital signals, in the present invention, pulse width is used in sensing the objects' physical or chemical properties. Pulse signals that change with the sensing values are digitized in the interrogator during communication rather than being converted in tags, thereby no dedicated ADC and its complex peripheral circuits are needed, and a faster and more power economical process, therefore, is enabled.

In one embodiment of the present invention, an exemplary tag device has a mono-stable multi-vibrator array. Triggered by a synchronous signal, the mono-stable multi-vibrator array generates a pulse sequence, the width of the pulses in which changes with the sensing values of resistive sensors or capacitive sensors in the array. This sensing pulse is concatenated to an ID code sequence generated by a memory array. The ID code can be either leading the sensing pulse sequence or behind it (in a more complex circuit, the ID can also be inserted in between sensing pulses, or sensing pulses are in the middle of an ID code), and in the ID code, the sensor array information, such as sensor type, sensor position and sensor number in the array, sensing baseline, and sensing range, can be included. The result code sequence is then modulated and transmitted by the tag device by loading and unloading its antenna.

In another embodiment of the present invention, several tag devices having sensor arrays or sensors incorporated form a sensor group. Each tag device in this sensor group generates a code sequence including a sleep time section, an ID code, and sensing pulses. The sleep time section is for avoiding conflicts among code sequences generated by difference tags, and the length of the sleep time section is different for each tag. The result signal is a modulated code sequence having ID codes and sensing pulses emitted by the tags in the time slots provided by the sleep time sections.

Upon receiving the code, the interrogator device detects and receives the ID code, and digitalizes the pulse width of the sensing pulses. The sensing value is then calculated based on the ID code and the width value of sensing pulses. In the overall data acquisition process, digitization of the sensing values is in parallel with communication between tags and the interrogator. No extra time is needed.

Features and advantages of the invention will be apparent from the following description of presently preferred embodiments, given for the purpose of disclosure and taken in conjunction with the accompany drawings.

DETAILED DESCRIPTION OF THE INVENTION

Figure 1:
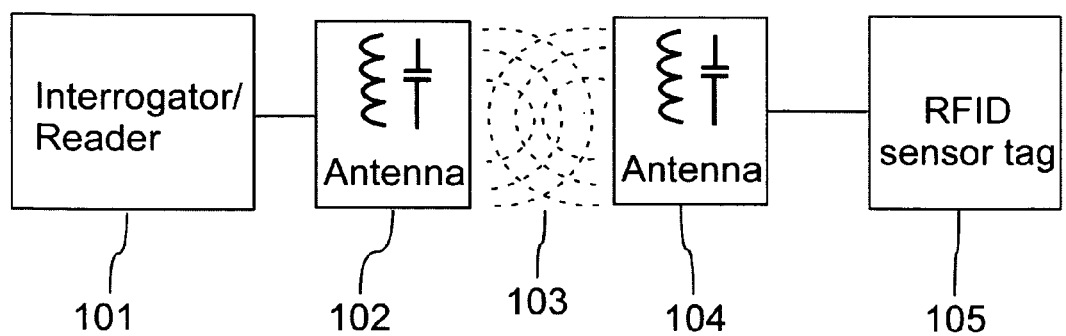
FIG. 1 is a block diagram of an RFID sensing system including a tag device and an interrogator device.

As depicted in FIG. 1, an RFID sensing system comprises an interrogator device 101 with an antenna 102 and an RFID sensor tag device 105 with an antenna 104. Normally, the RFID sensor tag device 105 has no internal power source. It gains power from a near field or far field RF 103 generated by the interrogator device 101. After the tag device 105 is powered, it then changes the amplitude of the RF carrier with a code stored inside the device. The change in amplitude is detected by the interrogator device 101 and the patterns in the amplitude change, which contain the code information, are examined. The demodulated code is used for further data processing.

Figure 2:
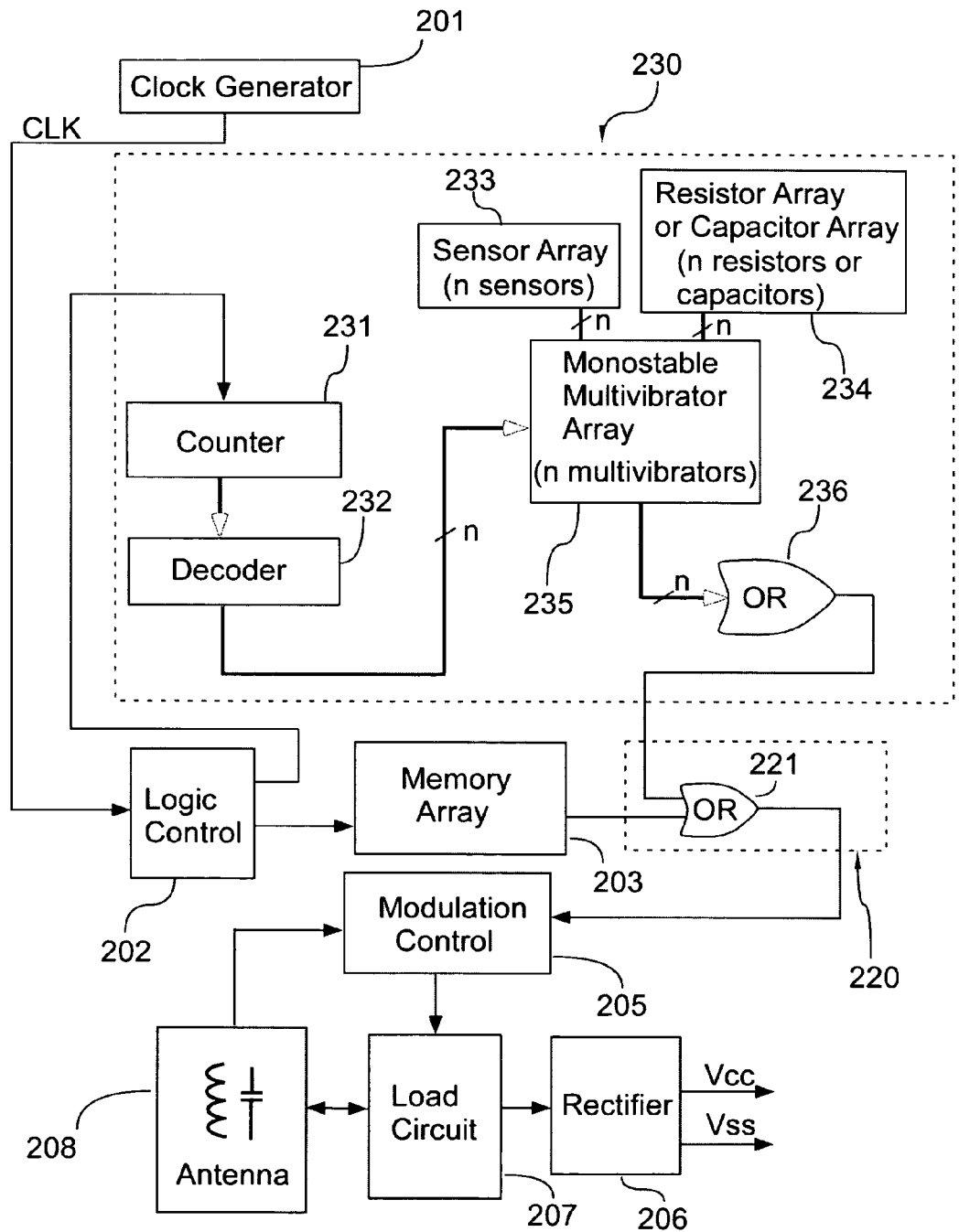
FIG. 2 illustrates a schematic block diagram of an RFID tag device with a sensor array included.

Referring to FIG. 2, an RFID tag includes a clock generator 201, which provides clock signals for a logic control block 202. A memory array 203 generates an ID code sequence synchronized by a signal output from the logic control block 202. Another control signal generated in the logic control block 202 is used to trigger a sensing pulse sequence generator 230, the output signals of which merge with the ID code sequence in a circuit 220. The result signal then is modulated in a modulation control block 205 and then loaded to an antenna 208 through a load circuit 207. The power supply of the RFID tag is provided by a rectifier 206, which generates DC voltage from the CW received by the tag.

Circuits in the sensing pulse generation block 230 are used for generating a pulse sequence, in which the width of pulses changes with sensing values of the sensor array. Depending on the sensor types, a variety of circuits can be used for generating the pulse sequence. An example of these circuits based on mono-stable multi-vibrators is depicted in FIG. 2. In this circuit, a counter 231 and a decoder 232 are used for distributing trigger pulses to a mono-stable multi-vibrator array 235 using the signals provided by the logic control block 202. A resistive or capacitive sensor array 233 with n sensor elements is connected to the mono-stable multi-vibrator array 235, and a capacitor or a resistor array 234 is used together with the sensor array 233 for determining the width of pulses generated by the mono-stable multi-vibrator array 235. The result pulses are concatenated together into a pulse sequence through an OR gate 236. The sensing pulse sequence generated in the block 230 and the ID code sequence provided through the memory array 203 are merged together in a circuit 220. In the example shown in FIG. 2, the circuit 220 includes an OR gate 221.

Figure 3:
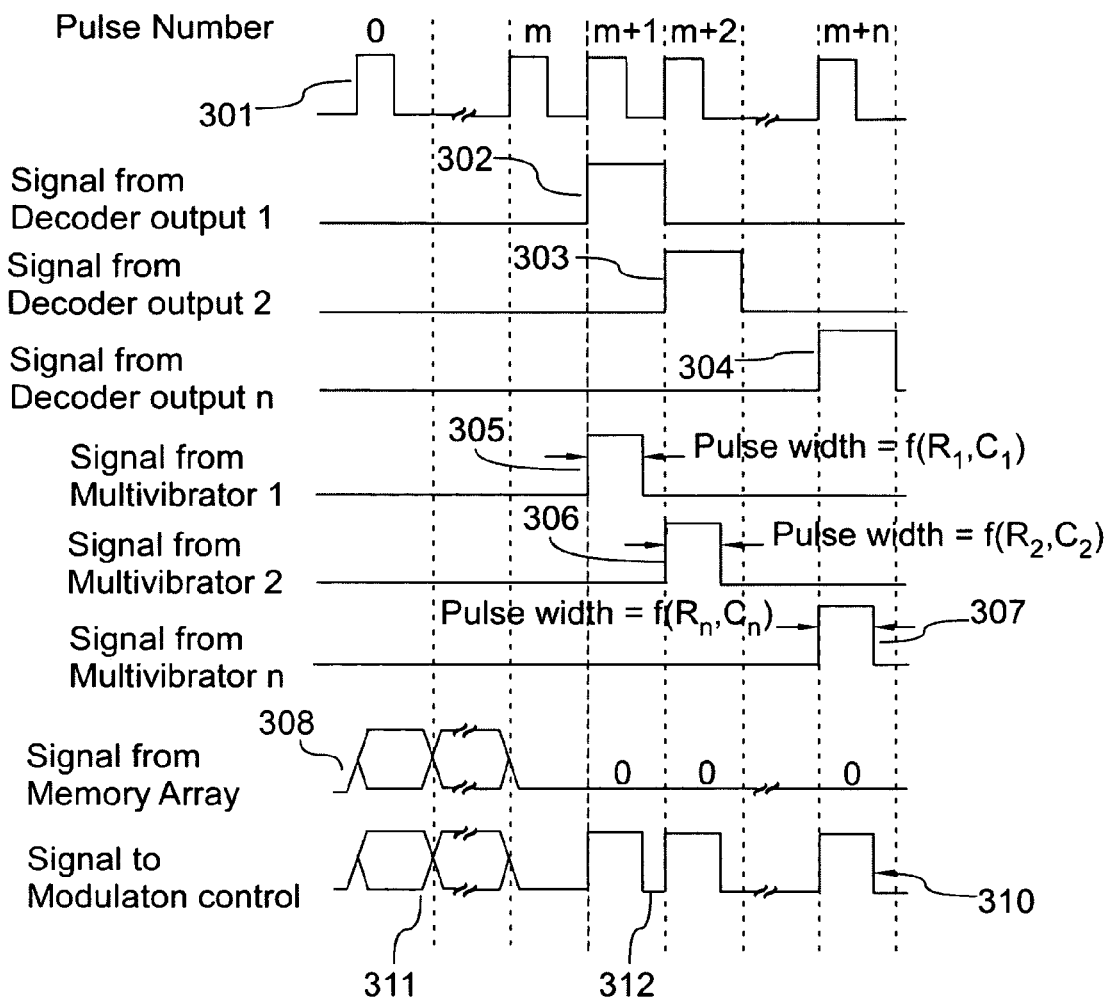
FIG. 3 is a timing chart for the generation of an RFID code sequence in an RFID sensor array; the RFID code sequence includes an ID code and sensing pulses.

FIG. 3 illustrates the timing chart for the device shown in FIG. Under the synchronization of a clock signal 301, a signal 308 with an ID code sequence of m bits and zeros (low level) of n+1 cycles is generated. At clock m+1, a pulse 302 provided by the decoder 232 (FIG. 2) triggers a multi-vibrator in the mono-stable multi-vibrator array 235 to generate a sensing pulse 305, the width of which is a function of resistance R1 and capacitance C1. Either the resistor or the capacitor can be a sensor element. At clock m+2, a pulse 302 triggers a sensing pulse 306, the width of which is a function of resistance R2 and capacitance C2. In the same way, at clock m+n, a sensing pulse 307 is triggered by a pulse 304. The width of the pulse 307 is a function of resistance Rn and capacitance Cn. Through the OR gate 236, the pulses 305, 306, . . . 307 are concatenated into a sequence 312, which contains the sensing information acquired from the sensor array 233. The sensing pulse sequence 312 and the code sequence 308 are then merged into a sequence 310 in the OR gate 221. The result code sequence 310, which has an ID code 311 and the sensing pulse sequence 312, is sent to the modulation control block 205 for communication with the interrogator. The ID code 311 can be either ahead of the sensing pulse sequence 312 or behind it or in the middle of it. (FIG. 3 only shows the case when the ID code 311 is the leading code for concise illustration.)

In FIG. 3, only one pulse for each sensor element is shown. Actually, more than one pulse can be generated for each sensor element. For example, in the device shown in FIG. 2, a $\log_2(n)+k$ bit counter (231) with a $\log_2(n)$ to n decoder would allow k pulses for each sensor element (each sensor element is triggered k times in one sampling cycle). The width of these pulses can be used for calculating average sensing values.

Figure 4:
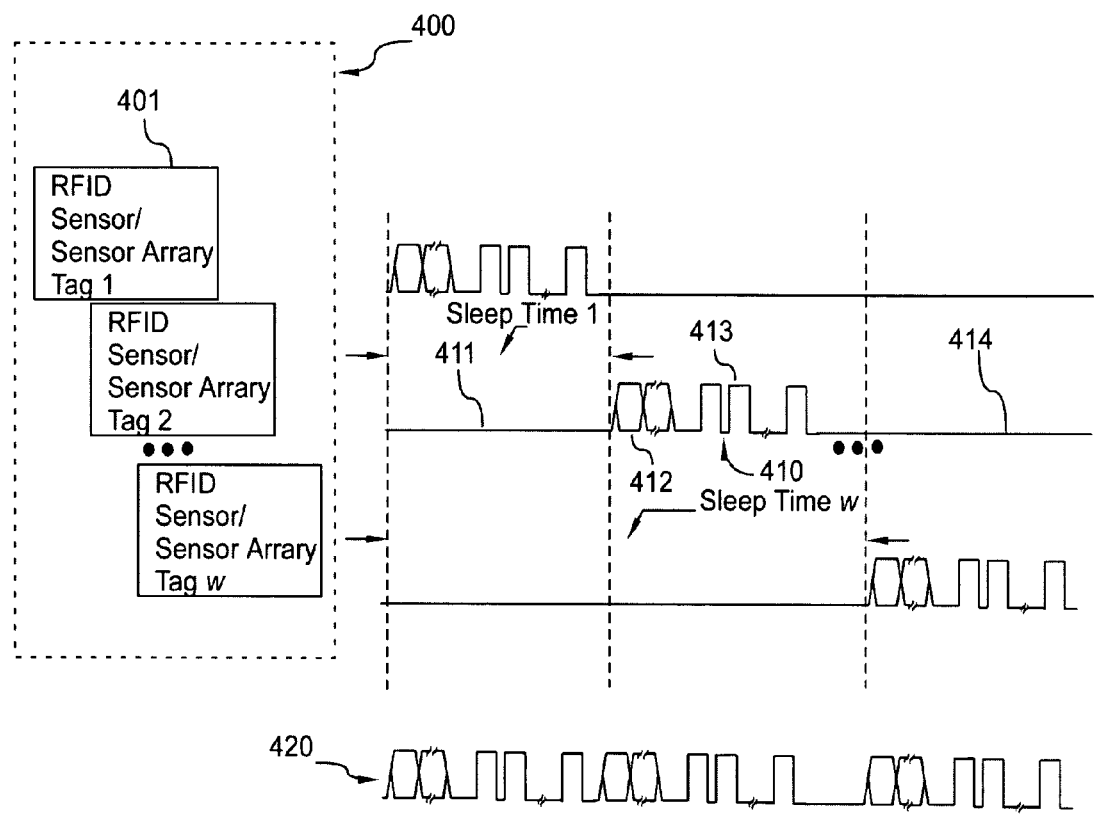
FIG. 4 is a timing chart for the generation of an RFID code sequence in an RFID sensor/sensor array group.

RFID sensor or sensor arrays can be grouped together in generating a code sequence. As shown in FIG. 4, an RFID sensor group includes RFID sensor tags 401. Each sensor tag (e.g. Tag 1, Tag 2, . . . Tag w) generates a code sequence including a low-level sleep time section 411, a code sequence 410 including an ID code 412 and a sensing pulse sequence 413, and a low-level stop time section 414. The sleep time section is used for avoiding collisions of code sequence emitted by different sensor tags, while the stop time is needed for synchronizing code repeating (when the code sequence is generated only once after power-up, the stop time is not necessary). Accordingly, when the RFID sensor group has w sensor tags, if the maximum length of the code sequence 410 is t, for the RFID sensor tag number l, the length of the sleep time section 411 should be longer than (l−1)t, while the length of the stop time section 414 should be longer than (w−l)t. A result code 420 is generated with all sensing information and ID information included.

Figure 5:
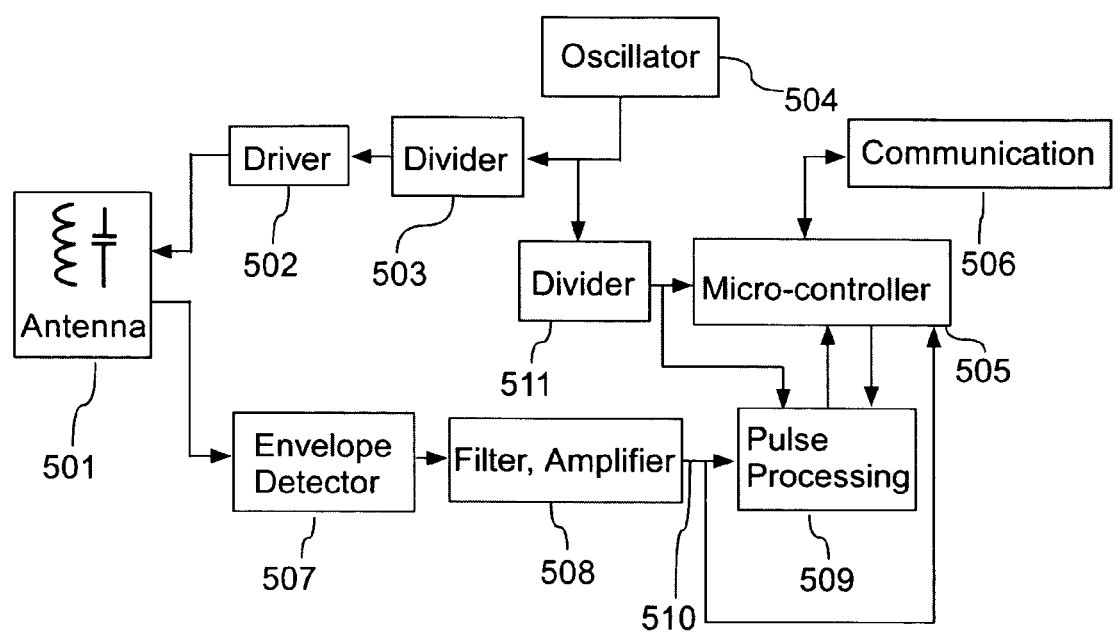
FIG. 5 shows a schematic block diagram of an RFID interrogator device.

Block diagram of an exemplary interrogator circuit is depicted in FIG. 5. In this circuit, signals from an antenna 501 pass through an envelope detector 507, where pulse signals are separated from the carrier. The output signals from the envelope detector 507 pass through a filter and amplifier circuit 508. The result code sequence 510 is sent to a pulse processing block 509, and a microcontroller 505. The ID code in the code sequence is detected and read by the microcontroller 505, while the width of sensing pulses is digitized in the pulse-processing block 509. A circuit 506 is used for the communication between the microcontroller 505 and a host computer (not shown in the figure), and the clock signals for the microcontroller 505 and the pulse processing circuit 509 are provided by an oscillator 504 through a divider 511. The interrogator also provides CW signals to the sensor tags. In the example circuit depicted in FIG. 5, the same oscillator 504 is used for generating the CW signals through a frequency divider 503 and a driver 502.

Figure 6:
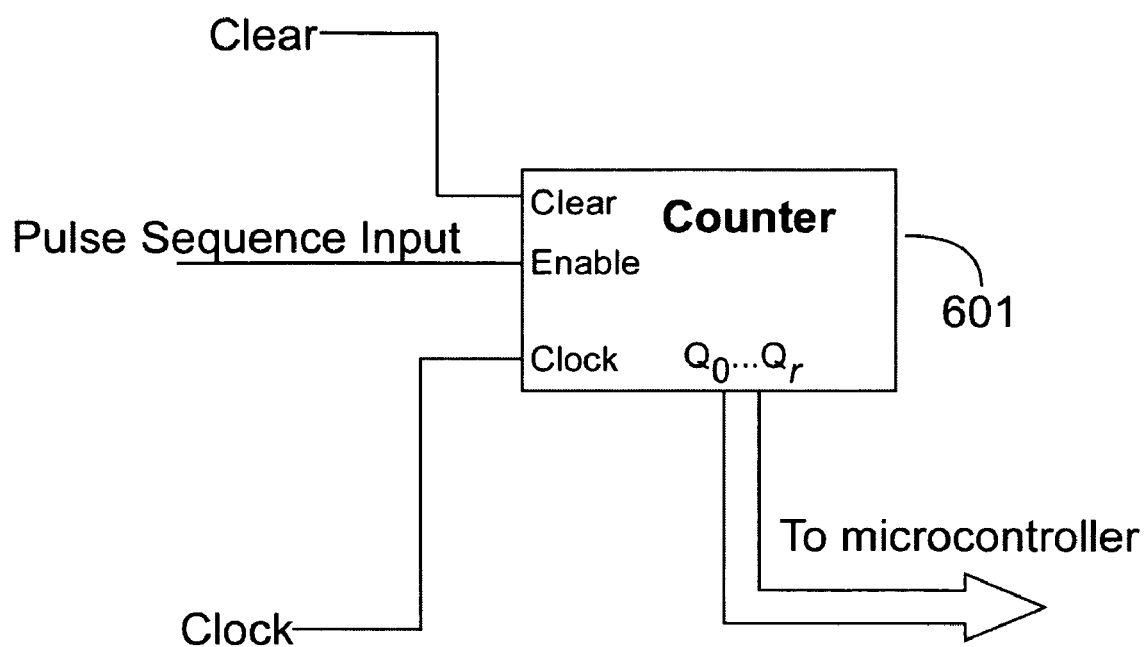
FIG. 6 shows an embodiment of the pulse-processing block in FIG. 5.
Figure 7:
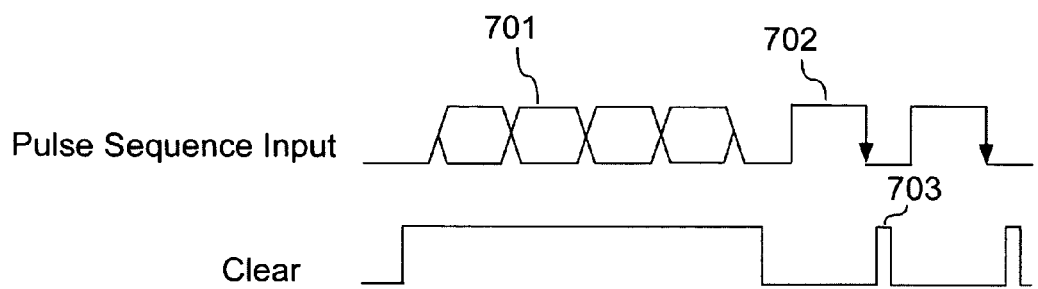
FIG. 7 is a timing chart for the pulse processing.

An example of the pulse-processing block 509 (FIG. 5) in the interrogator is shown in FIG. 6, where it includes a counter 601. In the circuit, the "Clear" signal is provided by the microcontroller 505. The Pulse Sequence is the code sequence 510, and the "Clock" signal is generated by the oscillator 504 through the divider 511. The output signals $Q_0$ to $Q_r$ of the counter 601 are sent to the microcontroller 505. Referring to the timing chart shown in FIG. 7, for ID code 701, the Clear signal is set to high level, which resets the counter to 0. When a sensing pulse 702 appears in the code sequence, the Clear signal is set to low level, enabling the counter 601. The counting value at the falling edge, which disables the counting at low level, is its pulse width. An interrupt is trigged for the microcontroller 505 at the falling edge of the sensing pulse and the microcontroller reads the counter value through its interrupt service routine and clears the counter with pulse 703 for digitizing the next sensing pulse width.

Figure 8:
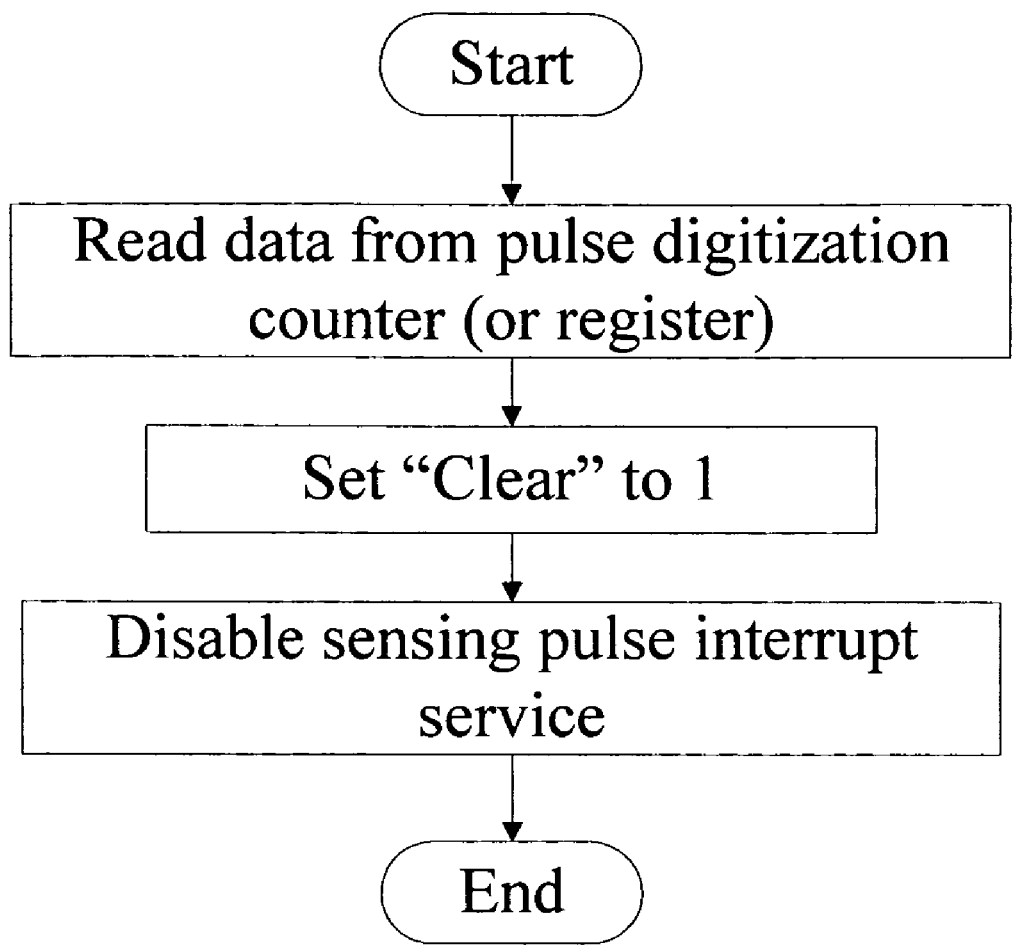
FIG. 8 is a flow chart of an interrupt service routine used for detecting sensing pulses.

The flow chart for an interrupt service routine example is depicted in FIG. 8. When the interrupt service program starts, it reads the counting value. Before the interrupt service routine ends, the counter is cleared and disabled by setting the Clear signal to 1, and the sensing pulse interrupt service is disabled (this interrupt service will be enabled in the main routine for detecting the next sensing pulse), so that it will not be triggered by other pulses before this sensing pulse is processed. In addition to a dedicated counter, the pulse processing can also be realized by using the microcontroller 505 directly based on timer interrupts. Some standard pulse measuring routines can be employed for digitizing the sensing pulse width.

Figure 9:
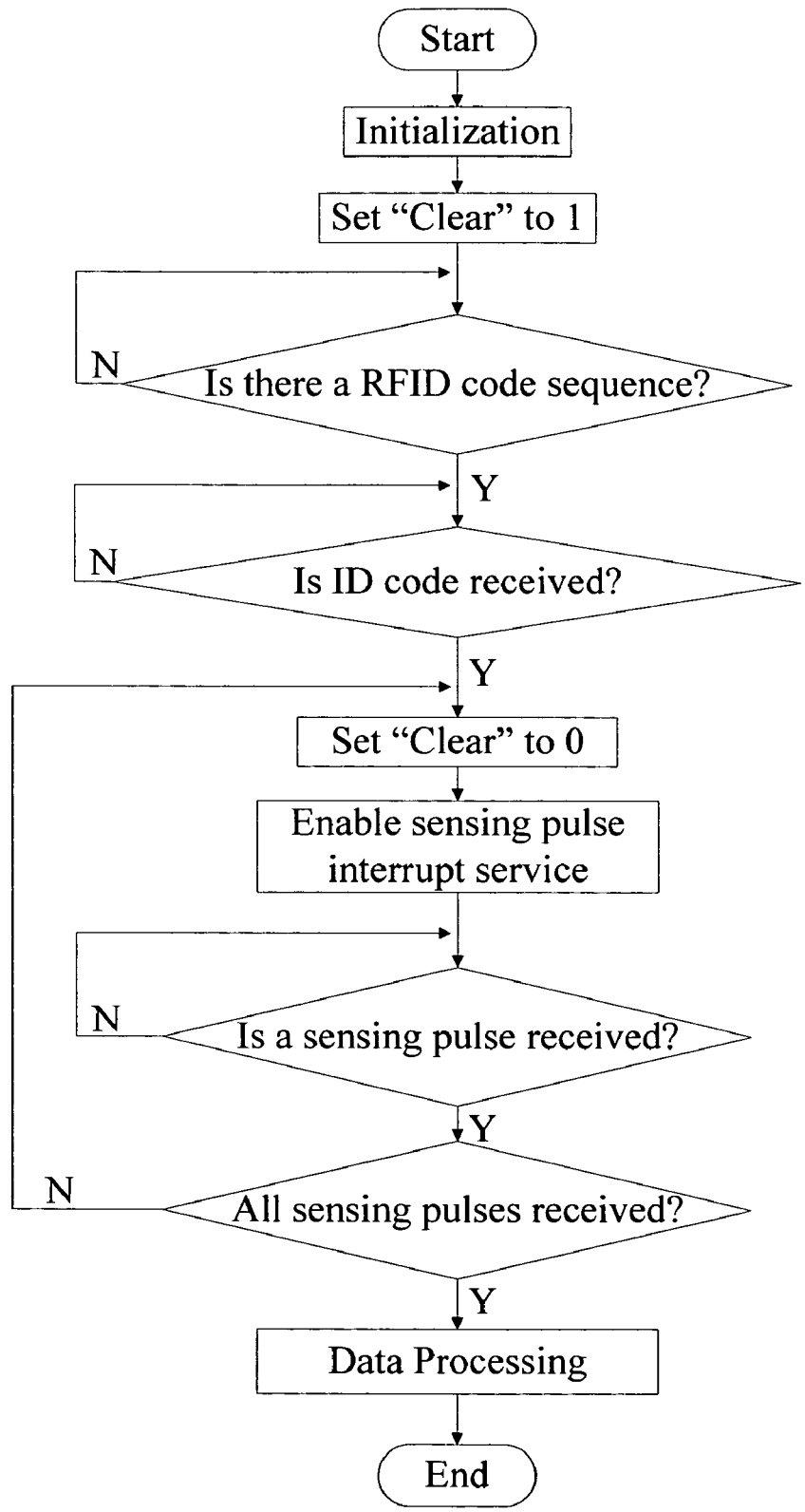
FIG. 9 is a flow chart of a main routine used by the RFID interrogator device.

The flow chart of a main routine example run in the microcontroller 505 (FIG. 5) is shown in FIG. 9. This routine is for a code sequence with ID code leading sensing pulses. After initialization, the microcontroller sets the Clear input of the counter 601 (FIG. 6) to high level to disable sensing pulse detection and waits for a RFID code to be received. Once a RFID code is detected, the microcontroller reads the ID code first. The ID code can be read using a standard serial communication program that employs a timer interrupt, and in the ID code, the code length and the sensing pulse number are included. At the end of the ID code communication, the microcontroller sets the Clear of the counter 601 to low level and enables the sensing pulse interrupt service (FIG. 8). Upon the falling edge of a sensing pulse, the sensing pulse interrupt service is triggered and before this interrupt service is disabled, the microcontroller reads in the pulse width value (counter value). The main routine waits for a sensing pulse measurement to be finished by examining if the sensing pulse interrupt service is disabled. Then the number of received sensing pulses is compared to the total number indicated in the ID code. If all sensing pulses are received, then main routine starts a data processing in which the sensing values are calculated, otherwise, the microcontroller sets the Clear of the counter 601 to low level and enables the sensing pulse interrupt service for detecting the next sensing pulse.

The invention claimed is:

1. A radio frequency identification tag device comprising:
    a clock generator;
    a sensor array having at least two different sensing elements combined for detecting a certain property of an object;
    a sensing pulse generator with said sensing elements incorporated for generating sensing pulses, the pulse width of which changes with sensing values obtained from said sensing elements, and at least one said sensing pulse is generated for each said sensing element;
    a logic circuit for generating a binary ID code sequence signal, which includes a blank code and an identification code containing information about said sensor array;
    a signal generator that concatenates said binary ID code sequence signal and said sensing pulses into a mixed code sequence signal through a logic operation of said blank code and said sensing pulses;
    a radio frequency tuned circuit;
    a circuit for emitting modulated signals generated with said mixed code sequence signal through said radio frequency tuned circuit.

2. The radio frequency identification tag device according to claim 1, wherein said sensing pulse generator includes at least one monostable multivibrator.

3. The radio frequency identification tag device according to claim 2, wherein said monostable multivibrator includes a resistive sensor.

4. The radio frequency identification tag device according to claim 2, wherein said monostable multivibrator includes a capacitive sensor.

5. The radio frequency identification tag device according to claim 1, wherein said signal generator includes an OR gate.

6. The radio frequency identification tag device according to claim 1, wherein said logic circuit includes a memory array.

7. The radio frequency identification tag device according to claim 6, wherein said binary ID code sequence signal is generated by using data stored in said memory array.

8. The radio frequency identification tag device according to claim 1, wherein said information about said sensor array includes the number of said sensing pulses.

9. A radio-frequency identification tag group that includes multiple tag devices with each of its tag devices comprising:
    at least one sensing device;
    a clock generator;
    a sensing pulse generator with said sensing device incorporated for generating sensing pulses, the pulse width of which changes with sensing values obtained from said sensing device;
    a logic circuit for generating a binary ID code sequence signal, which includes a blank code and an identification code containing information about said sensing device inside said sensing pulse generator;
    a signal generator that concatenates said binary ID code sequence signal and said sensing pulses into a mixed code sequence signal through a logic operation of said blank code and said sensing pulses;
    a sleep timer that adds a sleep section to said mixed code sequence signal generated by said signal generator for avoiding signal interference ;
    a radio frequency tuned circuit;
    a circuit for emitting modulated signals generated with said mixed code sequence signal through said radio frequency tuned circuit.

10. The radio frequency identification tag device according to claim 9, wherein said sensing pulse generator includes a monostable multivibrator.

11. The radio frequency identification tag device according to claim 10, wherein said monostable multivibrator includes a resistive sensor.

12. The radio frequency identification tag device according to claim 10, wherein said monostable multivibrator includes a capacitive sensor.

13. The radio frequency identification tag device according to claim 9, wherein said signal generator includes an OR gate.

14. The radio frequency identification tag device according to claim 9, wherein said sensing device includes at least one sensor array having at least two different sensing elements combined for detecting a certain property of an object.

15. The radio frequency identification tag device according to claim 9, wherein said information about said sensing device includes the type of said sensing device.

16. A system for identifying and reading sensing values, comprising:

a radio frequency identification tag group that includes multiple tag devices with each of its tag devices comprising at least one sensing device, a clock generator, a sensing pulse generator with said sensing device incorporated for generating sensing pulses, the pulse width of which changes with sensing values obtained from said sensing device, a logic circuit for generating a binary ID code sequence signal that includes a blank code and an identification code containing information about said sensing device, a signal generator that concatenates said binary ID code sequence signal and said sensing pulses into a mixed code sequence signal through a logic operation of said blank code and said sensing pulses, a sleep timer that adds a sleep section to said mixed code sequence signal for avoiding signal interference, a radio frequency tuned circuit, and a circuit for emitting modulated signals generated with said mixed code sequence signal through said radio frequency tuned circuit;

a radio frequency interrogator device having a circuit that detects said mixed code sequence signal generated by said radio frequency identification tag group, a serial communication unit for obtaining said identification code from said mixed code sequence signal, a pulse processing unit for measuring pulse width of said sensing pulses in said mixed code sequence signal, a sensing value processing unit that calculates sensing values using the pulse width measured by said pulse processing unit and the information about said sensing device included in said identification code;

17. The system for identifying and reading sensing values according to claim 16, wherein at least one of said sensing pulses is generated by a monostable multivibrator.

18. The radio frequency identification tag device according to claim 16, wherein said information about said sensing device includes the type of said sensing device.

19. The radio frequency identification tag device according to claim 16, wherein said sensing device includes at least one sensor array having at least two different sensing elements combined for detecting a certain property of an object.

20. The radio frequency identification tag device according to claim 19, wherein said information about said sensor array includes the number of said sensing pulses and the type of said sensor array.

* * * * *